United States Patent [19]

Hawley, III

[11] 4,006,713
[45] Feb. 8, 1977

[54] COLLAPSIBLE DOG HOUSE

[76] Inventor: Charles B. Hawley, III, 10 Quincy St., Chevy Chase, Md. 20015

[22] Filed: Dec. 23, 1975

[21] Appl. No.: 643,643

[52] U.S. Cl. .................................. 119/19; 52/262
[51] Int. Cl.² ........................................ A01K 1/02
[58] Field of Search ............ 119/19, 23; 46/19, 20, 46/21; 52/233, 262, 264

[56] References Cited
UNITED STATES PATENTS

| 1,455,105 | 5/1923 | Butcher | 119/19 |
| 1,484,518 | 2/1924 | Meadows | 119/19 |
| 2,498,411 | 2/1950 | Geib | 52/262 |
| 3,256,860 | 6/1966 | Parker | 119/19 |

Primary Examiner—Hugh R. Chamblee
Attorney, Agent, or Firm—Cushman, Darby & Cushman

[57] ABSTRACT

The collapsible dog house has two opposite side walls, a front wall, a rear wall, a roof and a floor which are separable components, preferably made of marine plywood. The floor and roof are provided with rectangular skirts. The side walls are notched and grooved to interfit with the skirts and front and rear walls. Interlocking means are provided on the two skirts so that when the skirts are in confronting abutment they define the perimeter of a case whose sides are the roof and floor of the dog house. In that instance, the side walls, front wall and back wall are received in a stack within the case. Hardware is provided for retaining the case in a closed condition. A carrying handle is provided on one skirt, so the case may be carried like a brief case. Preferably one skirt is wider than the other, and the handle is mounted near the free edge of the wider skirt, so it is more centered on the case, for balance in carrying. The skirt of the floor doubles as a sill to keep out rain run off and the like.

9 Claims, 6 Drawing Figures

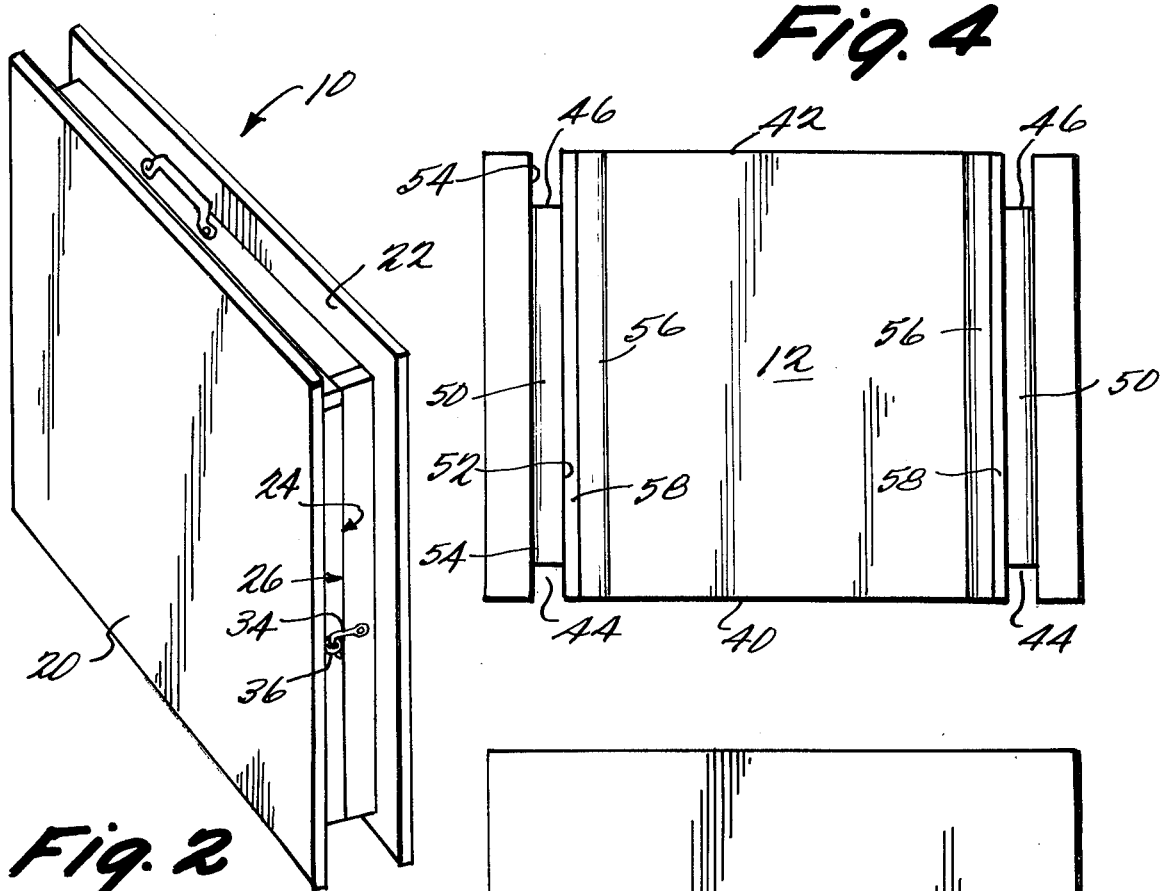
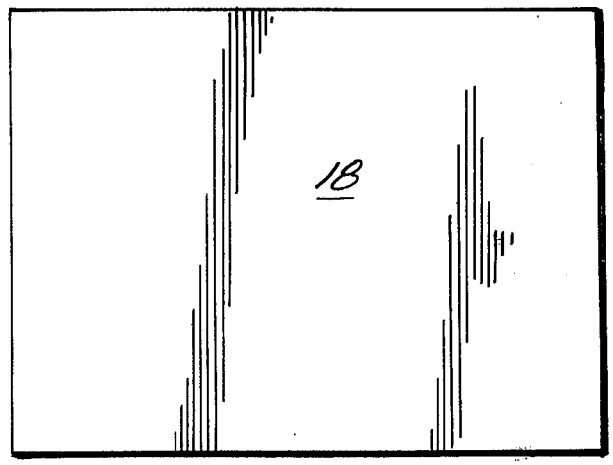
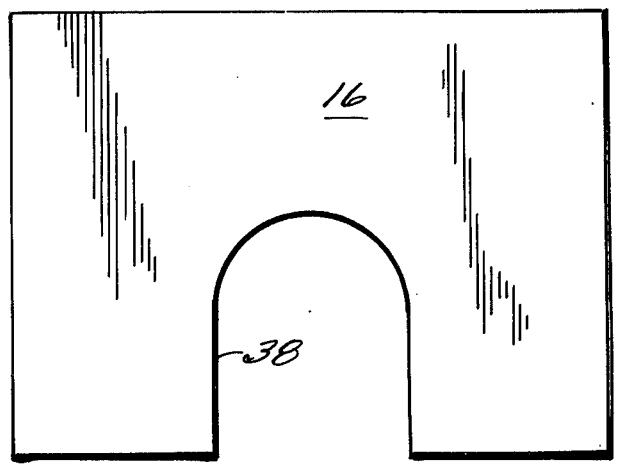

COLLAPSIBLE DOG HOUSE

BACKGROUND OF THE INVENTION

Portable and collapsible boxes, pet cages, artists easels and the like are well-known in the prior art and are exemplified by what is shown in the following U.S. patents:

| Patentee | Patent No. | Issue Date |
| --- | --- | --- |
| J. H. Donaldson | 1,151,671 | Aug. 31, 1915 |
| W. Cunningham | 1,941,662 | Jan. 2, 1934 |
| N. Hackett | 2,092,155 | Sept. 7, 1937 |
| J. J. Latura | 2,410,221 | Oct. 29, 1946 |
| J. D. McKean | 3,048,147 | Aug. 7, 1962 |
| J. Messeas | 3,144,852 | Aug. 18, 1964 |
| H. A. Parker | 3,256,860 | June 21, 1966 |
| L. E. Rogers | 3,870,366 | Mar. 11, 1975 |
| A. V. Sanzone et al. | 3,890,932 | June 24, 1975 |

SUMMARY OF THE INVENTION

The collapsible dog house has two opposite side walls, a front wall, a rear wall, a roof and a floor which are separable components, preferably made of marine plywood. The floor and roof are provided with rectangular skirts. The side walls are notched and grooved to interfit with the skirts and front and rear walls. Interlocking means are provided on the two skirts so that when the skirts are in confronting abutment they define the perimeter of a case whose sides are the roof and floor of the dog house. In that instance, the side walls, front wall and back wall are received in a stack within the case. Hardware is provided for retaining the case in a closed condition. A carrying handle is provided on one skirt, so the case may be carried like a brief case. Preferably one skirt is wider than the other, and the handle is mounted near the free edge of the wider skirt, so it is more centered on the case, for balance in carrying. The skirt of the floor doubles as a sill to keep out rain run off and the like.

The principles of the invention will be further discussed with reference to the drawing wherein a preferred embodiment is shown. The specifics illustrated in the drawing is intended to exemplify, rather than limit, aspects of the invention as defined in the claims.

BRIEF DESCRIPTION OF THE DRAWING

IN THE DRAWING

Figure 1:
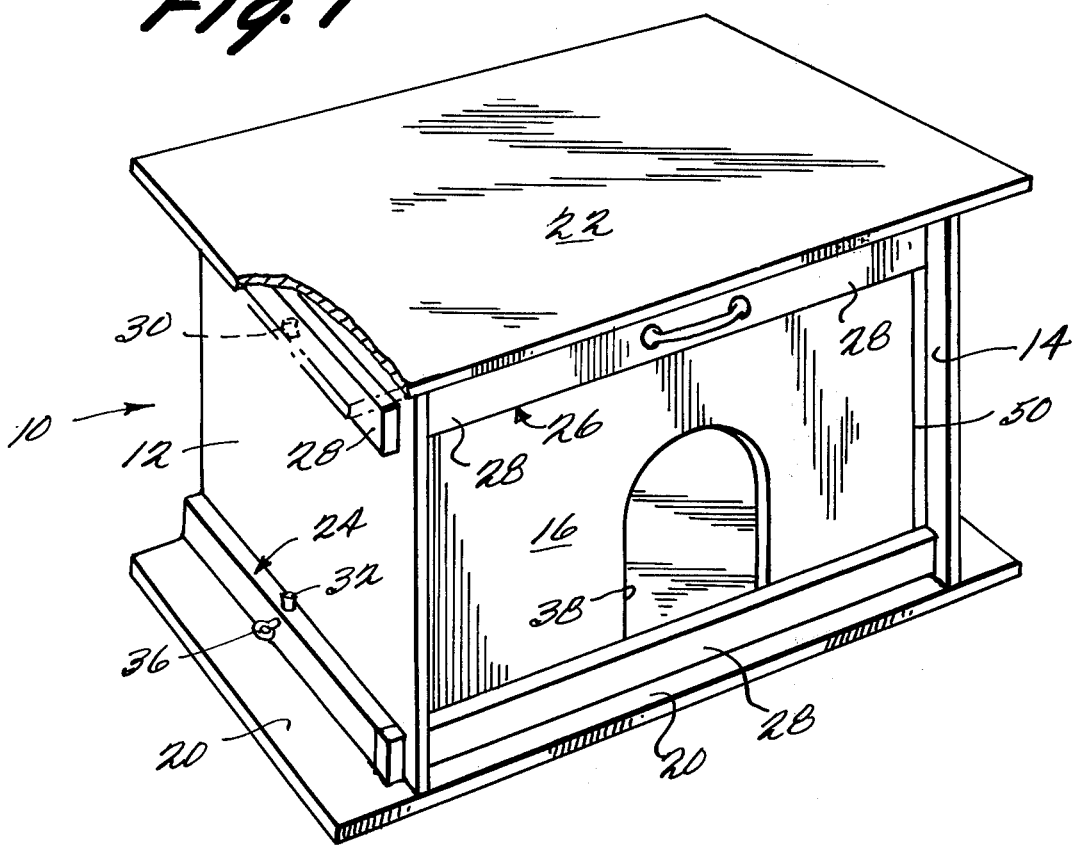
Figure 3:
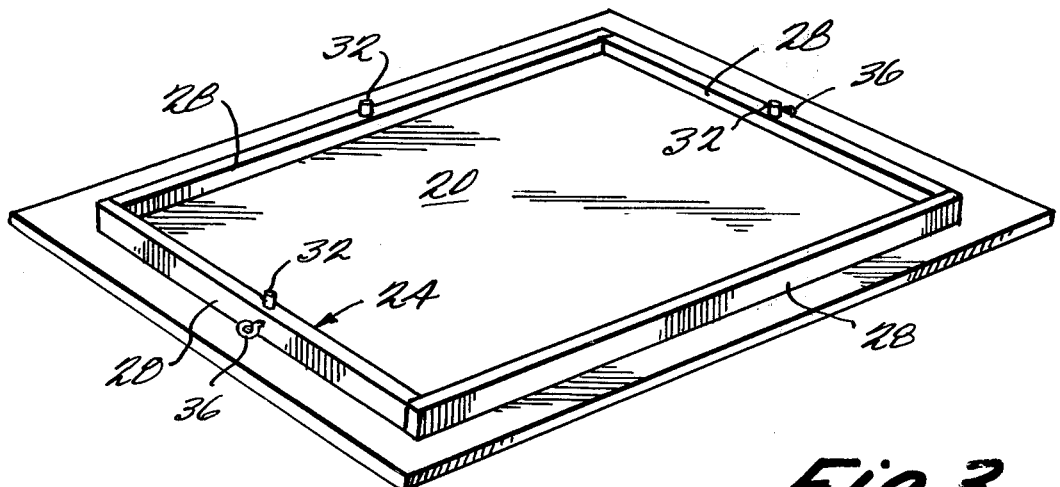

FIG. 1 is a perspective view of the collapsible dog house in a set-up condition, ready for use;

FIG. 2 is a perspective view of the collapsible dog house in a knocked-down condition, made into a case ready to be carried;

FIG. 3 is a perspective view of the dog house floor from above;

FIG. 4 is a side elevation view of the inner face of one side wall of the dog house;

FIG. 5 is an elevation view of the rear wall; and

FIG. 6 is an elevation view of the front wall.

DETAILED DESCRIPTION OF THE PRESENTLY PREFERRED EMBODIMENT

The collapsible dog house 10 includes two opposite side walls 12, 14, a front wall 16 a rear wall 18, a floor 20 and a roof 22. The panel portions of these members are preferably made of plywood which can withstand use outdoors, for instance marine plywood.

The inner faces of the floor 20 and roof 22 are each provided with a skirt 24, 26 in the figure of a rectangle whose sides are generally parallel to the borders of the panel portion of the respective member 20, 22. By preference, as shown, the skirts are inset from the borders. The skirts are of substantial height and one, 26, is seen to be of slightly greater height than the other.

The skirts are shown each made of four wooden strips 28, such as that used for furring, with one edge secured flat-wise against the inner face of the panel portion of the respective member 20, 22. At the corners, the strips 28 need not be mitered, dovetailed or the like, they may simply be lapped and secured to one another. The securements may be nails, screws or waterproof adhesive, or a combination of these, or the like.

The free edges of the two skirts 24, 26 are provided with interlockable securement means. In the embodiment shown, this securement means is provided by sockets 30 in three of the strips 28 of the skirt 26 and correspondingly placed dowels 32 projecting from three of the strips 28 of the skirt 24. When the dog house is erected as in FIG. 1, the securements means 30, 32 is not in use. However, when the inner sides of floor 20 and roof 22 are confronted so that the free edges of the skirts 24 and 26 are in coextensive abutment, the dowels 32 are received in the sockets 30 to prevent relative lateral movement of the two case halves 20, 22. A functionally equivalent interlockable equipment could be provided instead of the dowels 32 and socket 30. For instance interdigitable tongues and grooves or notches and tabs could be provided on the respective skirts 24 and 26.

For use when the dog house is disassembled and the case is assembled from its roof and floor, the skirts 24 and 26 are provided with cooperative fastener means, such as eye-mounted hooks 34 on the outsides of two opposite strips of one skirt and eyes correspondingly positioned on the outsides of two opposite strips of the other skirt. The hooks 34 may be pushed into the eyes 36 to retain the case halves 20, 22 secured in confronting relation as shown in FIG. 2. Generally, the cooperative fastener means 34, 36 are not used when the dog house is in its erected condition, as shown in FIG. 1. However, they could be used, for instance elastic pongee cords could be hooked between the fasteners 34, 36 to help gravity keep the dog house assembled when erected, for instance to keep strong winds from blowing the roof off.

Referring to FIGS. 5 and 6, the front and rear walls 16, 18 are simple rectangular panels. The front wall is provided with an entrance opening 38, for instance in the shape of a simple arch. Other openings for light, ventilation or the like could be provided.

The two side walls 12, 14 are substantially duplicates of one another, so only one is shown in detail, in FIG. 4.

The side wall 12 is generally rectangular. Its lower edge 40 and upper edge 42 are each provided with two notches 44, 46. The notches 44, 46 are of generally rectangular figure, shaped and spaced to match the transverse cross-section of the respective skirt strips 28. Thus, because the strips of the skirt 26 are of greater vertical extent than the skirt 24, the notches 46 are correspondingly deeper than the the notches 44.

Two further strips 50 are secured on the inner face of the side wall 12 in a vertical orientation, each with a lower end at the base of the respective notch 44 and an upper end at the base of the respective notch 46. The edge 52 of each strip 50 that is closer to the center of the inner face of the side wall 12 is in vertical alignment with the corresponding, inner side 54 of the respective notches 44, 46.

Two additional strips 56 are secured on the inner face of the side wall 12 paralleling the strips 50 and paired therewith. The strips 56 are longer than the strips 50, as the strips 56 extend to and between the upper and lower edges of the panel portion of the side wall 12. The lateral distance between the paired strips 50 and 56 of each pair is equal to the thickness of the respective one of the front wall 16 and the rear wall 18, to provide a groove or channel 58 to vertically slidingly receive a respective marginal vertical edge portion of the front wall 16 or rear wall 18. In the embodiment shown, the strips 50 and 56 are constituted by wooden quarter rounds, with flat edges thereof facing toward one another within each channel 58.

In order to further describe a best mode, a set of exempliary dimensions will not be given. They should not be understood as limiting the scope of the invention.

In the example under discussion, the panel portions are made of one-quarter inch marine plywood. The floor and roof each measure 2 × 2.5 feet, the side walls each measure 1.5 × 2 feet, and the front and rear walls each measure 1.5 feet by 1 foot 11.5 inches. The door opening measures 8.5 × 10.5 inches, as this example is for accomodating a small dog. The strips of the skirt for the roof are 0.75 × 2.0 inches and the strips of the skirt for the floor are 0.75 × 1.5 inches. The quarter rounds measure 0.75 inch across each flat side. Preferably, the wood parts of each member are assembled with nails and waterproof adhesive, and the wood is covered with a sealer against weather and dirt, so it can withstand periodic cleaning and being outdoors.

To disassemble the dog house and convert it to its FIG. 2 case, the roof is lifted off, the front and rear walls are slid up out of the respective channels in the side walls, and the side walls are lifted off the floor. Then the front and rear walls and the side walls are stacked in any order within the skirt of either the roof or the floor, and the other one of the floor or roof is confronted therewith until the dowels home in the sockets. Then the hooks are inserted in the eyes and the case is ready to carry by its handle like a brief case. The case will stand free, resting on the roof and floor edges as shown in FIG. 2.

To erect the dog house and convert it from the case shown in FIG. 2 to the dog house shown in FIG. 1, the hooks are pulled from the eyes and the two case halves are separated. The front, rear and side walls are removed from within the respective skirt. Next, the floor is placed on the ground where the dog house is to be sited, and the side walls are set within the skirt, with the notches in the lower edge of each stradling the respective front and rear strips of the floor skirt. The outer face of the two side wall panels are disposed against the inner faces of the two respective strips of the floor skirt. The front and rear walls are slid down into the respectively opposed pairs of channels on the inner faces of the side walls and the roof is lowered into place, until the front and rear strips of the roof skirt bottom in the notches of the side wall upper edges and the panel portion of the roof rests on the side wall, front wall and rear wall upper edges. The dog house is now erected and ready to receive a dog.

A contemplated use of the dog house 10 is to permit those who go on vacation, camping or the like and want to take their dog, to take a shelter that the dog will find familiar and comfortable. The dog house 10 is easy to put up and take down, easy to carry, can be relatively durable and sheltering. It is so simple that it can be inexpensively constructed and sold, permitting many for whom it is useful to be able to afford one.

Modifications will now suggest themselves to those skilled in the art. For instance the front and rear walls could be cut to different heights and the upper edges of the side walls slanted so that the roof has a slight pitch to improve run off. Ventilation openings could be provided. Parts can be scaled up or down in size. The relative amount of floor and/or roof overhang could be increased or decreased.

It should now be apparent that the collapsible dog house as described hereinabove, possesses each of the attributes set forth in the specification under the heading "Summary of the Invention" hereinabove. Because the collapsible dog house can be modified to some extent without departing from the principles of the invention as they have been outlined and explained in this specification, the present invention should be understood as encompassing all such modifications as are within the spirit and scope of the following claims.

What is claimed is:
1. A collapsible dog house, comprising:
   six separable panel members including a floor, a roof, two opposite side walls and a front wall and a rear wall, each being generally rectangular;
   means defining a dog entrance opening through the front wall;
   a depending skirt on the underside of the roof, including a forward element, a rear element and two opposite side elements;
   an upstanding skirt on the upper side of the floor, including four elements corresponding to those of the roof skirt, and being correspondingly placed, so that the two skirts may be placed in confronting engagement;
   cooperative retaining and securement means on the roof and on the floor, which are engaged when the two skirts are in confronting engagement for maintaining the confrontation against axial and lateral disengagement;
   distance between the roof underside and floor upper side when the two skirts are in confronting engagement being sufficient to permit the two opposite side walls, the front wall and the rear wall to be enclosed therebetween in a stack, surrounded by the skirts;
   handle means provided on at least one of the floor and roof members, sited to permit the dog house, when the two skirts are maintained in confronting engagement and house said stack, to be carried thereby, brief case fashion, that is, with the floor underside and roof upper side generally vertically oriented;
   means defining four notches in each side wall, including:
   a first notch in the upper edge thereof near the front edge thereof;
   a second notch in the upper edge thereof near the rear edge thereof;

a third notch in the lower edge thereof near the front edge thereof; and a fourth notch in the lower edge thereof near the rear edge thereof;

the notches being respectively shaped and positioned to receive:

the forward element of the depending skirt;

the rear element of the depending skirt;

the forward element of the upstanding skirt; and the rear element of the upstanding skirt, when the side walls are erected between the roof and the floor;

means defining two generally vertically extending channel on the inner side of each side wall, including:

one disposed to the rear of the first and third notches on the same side wall; and the other disposed to the fore of the second and fourth notches on the same side wall;

the one grooves of the two side walls being respectively shaped and positioned to receive the opposite vertical edge margins of the front wall when the side walls and front wall are erected on the floor;

the other grooves of the two side walls being respectively shaped and positioned to receive the opposite vertical edge margins of the rear wall when the side walls and rear wall are erected on the floor, whereby:

the dog house may be erected by erecting the side walls on the floor, inserting the respective edge margins of the front wall and rear wall in the respective grooves to erect the front wall and rear wall on the floor, and lowering the roof until the forward and rear elements of the depending skirt are received in the respective first and second notches of the respective side walls.

2. The dog house of claim 1, wherein:
said four elements of each skirt are contiguous elements set in a rectangular array.

3. The dog house of claim 2, wherein:
the entrance opening is contiguous with the lower edge of the front wall so that the forward element of the upstanding skirt provides a means for preventing rain run off or the like from running into the dog house.

4. The collapsible dog house of claim 2, wherein:
one of said skirts is of greater height than the other and the handle means is provided on the forward element of the skirt of greater height, near the free edge thereof so as to be generally centered between the floor and roof, when the skirts are maintained in confronting engagement.

5. The collapsible dog house of claim 2, wherein:
the skirt elements and notches are each of substantially rectangular transverse cross-sectional shape.

6. The collapsible dog house of claim 1, wherein:
the cooperating securement means are provided by two hooks mounted on a respective two opposed skirt elements on the same skirt and two eyes mounted on a respective two opposed corresponding skirt elements on the other of said skirts, the respective hooks being removably receivable in the respective eyes.

7. The collapsible dog house of claim 1, wherein:
the cooperating retaining means are provided by two sockets provided in the free edges of two skirt elements on the same skirt and two protuberances provided on the free edges of two corresponding skirt elements on the other of said skirts, the protuberances being receivable in respective ones of the sockets to prevent relative lateral motion of the two skirts when the cooperative securement means are in use.

8. The collapsible dog house of claim 1, wherein:
each of said grooves is provided by and between pair of laterally spaced, parallel strips secured on the inner side of the respective side wall.

9. The collapsible dog house of claim 8, wherein:
the two groove-defining strips located nearest the front edges of the two respective side walls extend from the bases of the respective first notches to the bases of the respective third notches;

the two groove-defining strips located nearest the rear edges of the two respective side walls extend from the bases of the respective second notches to the bases of the respective fourth notches; and the four groove-defining strips located nearest the centers of the two respective side walls extend from the upper edges of the respective side walls to the lower edges of the respective side walls.

* * * * *